US011459122B2

(12) United States Patent
Jaramillo

(10) Patent No.: US 11,459,122 B2
(45) Date of Patent: Oct. 4, 2022

(54) MODULAR FLOOR SYSTEM FOR LARGE VEHICLE CONSTRUCTION

(71) Applicant: SPIRIT AEROSYSTEMS, INC., Wichita, KS (US)

(72) Inventor: Todd Brian Jaramillo, Wichita, KS (US)

(73) Assignee: SPIRIT AEROSYSTEMS, INC., Wichita, KS (US)

( * ) Notice: Subject to any disclaimer, the term of this patent is extended or adjusted under 35 U.S.C. 154(b) by 383 days.

(21) Appl. No.: 16/576,055

(22) Filed: Sep. 19, 2019

(65) Prior Publication Data

US 2021/0086887 A1 Mar. 25, 2021

(51) Int. Cl.
*B64F 5/10* (2017.01)
*B64C 1/18* (2006.01)
*B62D 25/20* (2006.01)

(52) U.S. Cl.
CPC ............ *B64F 5/10* (2017.01); *B64C 1/18* (2013.01); *B62D 25/2063* (2013.01)

(58) Field of Classification Search
CPC ........... B64C 1/18; F64F 5/10; B62D 25/2063
See application file for complete search history.

(56) References Cited

U.S. PATENT DOCUMENTS

| 3,995,328 | A | * | 12/1976 | Carolan | .................. | E03D 5/016 |
| | | | | | | 4/316 |
| 6,012,678 | A | * | 1/2000 | Hale | ..................... | B64D 11/02 |
| | | | | | | 244/118.5 |
| 7,303,363 | B2 | * | 12/2007 | Krause | ................... | B23Q 5/027 |
| | | | | | | 408/130 |
| 2006/0006284 | A1 | | 1/2006 | Vetillard et al. | | |
| 2007/0007392 | A1 | * | 1/2007 | Huber | ..................... | B64C 1/061 |
| | | | | | | 244/137.1 |
| 2011/0011978 | A1 | * | 1/2011 | Haack | ................ | B64D 11/0696 |
| | | | | | | 244/119 |

(Continued)

FOREIGN PATENT DOCUMENTS

CN 107117284 9/2017
EP 0593127 1/2002

OTHER PUBLICATIONS

International Search Report and Written Opinion dated Dec. 17, 2020 for PCT Appln. No. PCT/US2020/050127 Filed Sep. 10, 2020 and all references cited therein.

*Primary Examiner* — Michael H Wang
(74) *Attorney, Agent, or Firm* — Hovey Williams LLP

(57) ABSTRACT

A modular floor system with an integral utility for temporary installation in an unfinished aircraft fuselage to facilitate construction. The system includes multiple floor modules, each including a catch pan defining a pan volume, a grid top surface supported on the catch pan over the pan volume, and a utility manifold carrying a utility across the module and to the next module. The modules may be sized and shaped to conform to different installation locations within the vehicle body. The grid top surface is openable to access the pan volume to remove debris or items. Adjacent modules are coupled together with connectors. The utility may be vacuum, air, electricity, or water, and one manifold may carry air and another manifold may carry vacuum. A fixture may be connected to the vacuum manifold and receive an end of a drill so as to remove debris resulting from operation of the drill.

20 Claims, 3 Drawing Sheets

(56) References Cited

U.S. PATENT DOCUMENTS

| | | | |
|---|---|---|---|
| 2014/0175226 A1* | 6/2014 | Durand | B64D 43/00 244/120 |
| 2015/0048206 A1* | 2/2015 | Deloubes | B64C 1/18 244/119 |
| 2018/0148195 A1* | 5/2018 | Chan, Jr. | B21J 15/142 |
| 2020/0001967 A1* | 1/2020 | Pirner | B32B 7/08 |
| 2020/0023936 A1* | 1/2020 | Gardner | B64C 1/18 |

* cited by examiner

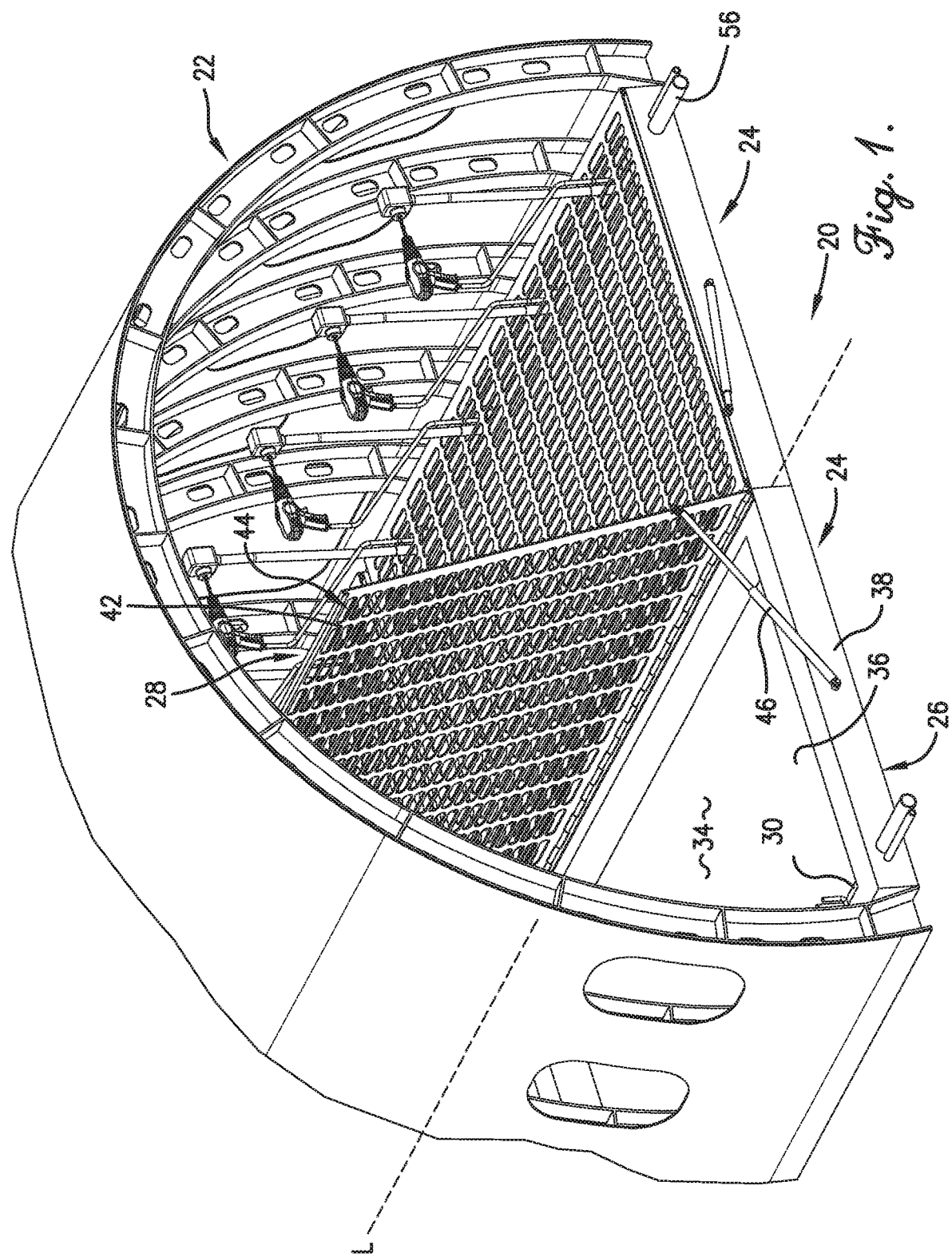

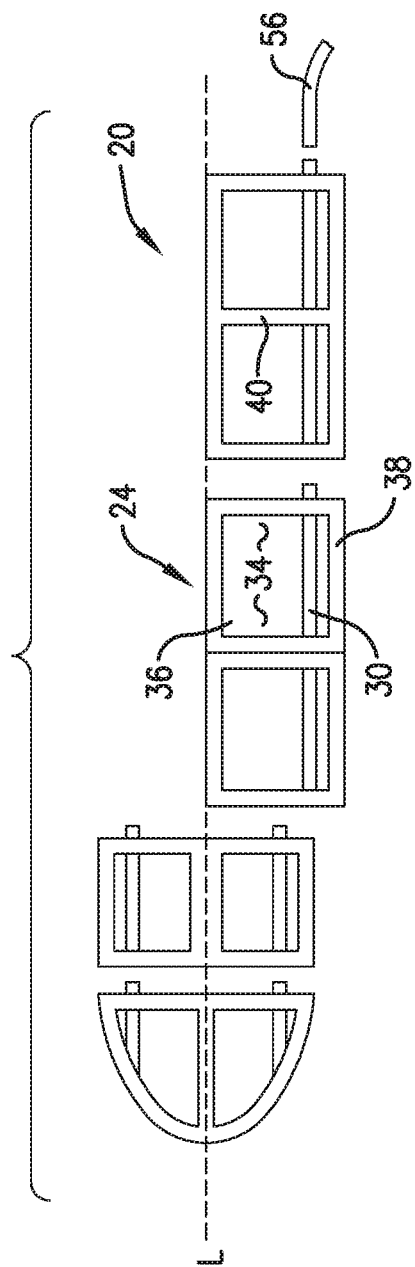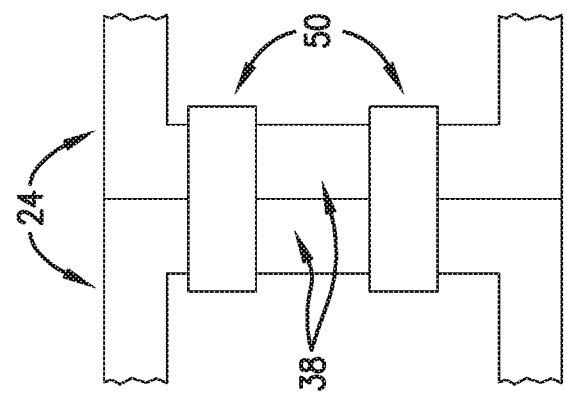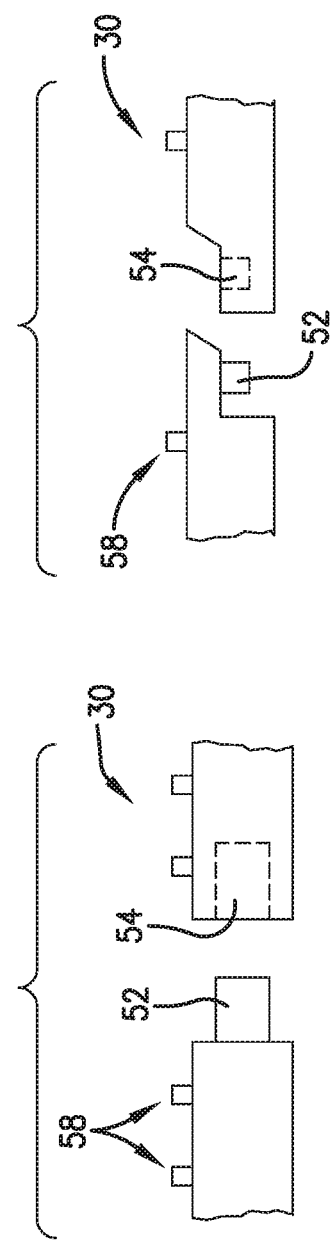

MODULAR FLOOR SYSTEM FOR LARGE VEHICLE CONSTRUCTION

FIELD

The present invention relates to temporary floor systems in manufacturing contexts, and more particularly, embodiments concern a modular floor system with an integral utility for temporary installation in an unfinished aircraft fuselage or other large vehicle body to facilitate construction.

BACKGROUND

It is desirable for workers to be able to stand and work within an unfinished aircraft fuselage which may have floor beams but no actual floor. Workers may create and position temporary ad hoc flooring material (e.g., plywood or composite sheets), but these may not be sufficiently stable or reliable. Further, workers often have to use drills or other devices within the fuselage, and the devices are attached by hoses or cords to air or electricity, and the hoses have to be routed through available openings in the fuselage. The hoses or cords may slide against and/or catch upon and damage the skin of the fuselage, and also create a tripping hazard for the workers. Additionally, chips, filings, and other debris created by the workers or items dropped by the workers may fall and accumulate within the fuselage. While an attempt may be made to remove the debris or items, they may become caught and remain in and around stringers, corners, and other structures and contours within the fuselage.

This background discussion is intended to provide information related to the present invention which is not necessarily prior art.

SUMMARY

Embodiments address the above-described and other problems and limitations of the prior art by providing a modular floor system with an integral utility for temporary installation in an unfinished aircraft fuselage or other large vehicle body to facilitate construction. In particular, embodiments may advantageously provide a more stable and secure surface on which workers may stand and work in the unfinished vehicle body; may provide utility connections within the vehicle body and relatively near to the point of work, which reduces damage and risk of tripping created by longer hoses or cords; and may catch and retain falling debris and dropped items which facilitates their subsequent removal from the vehicle body.

In an embodiment, a modular floor system is provided for temporary installation in an unfinished vehicle body. The modular floor system may include a plurality of floor modules, and each floor module may include a catch pan structure, a first grid top surface, and at least one utility manifold. The catch pan structure may include a bottom and a plurality of side walls defining a catch pan volume. The first grid top surface may include a generally planar surface presenting a plurality of openings, and may be physically supported on the plurality of side walls of the catch pan structure over the catch pan volume. The utility manifold may carry a utility across the catch pan structure and may include input and output connections and connection points. The input connection may be associated with a first side wall and receive the utility, the output connection may be associated with a second side wall, and the connection point may allow for connection to a device which may draw from the utility.

Various implementations of the foregoing embodiment may include any one or more of the following additional features. The unfinished vehicle body may be an unfinished aircraft fuselage with a length of at least five meters and a width of at least three meters. At least two of the floor modules may be identical in size and shape, and/or at least two of the floor modules may be different in size and shape so as to conform to different installation locations within the unfinished vehicle body. The catch pan structure may further include one or more intermediate walls dividing the catch pan volume. At least one floor module may further include a second grid top surface located adjacent to and being independently operable from the first grid top surface. The first grid top surface may be attached by one or more hinges to the catch pan structure, and may be rotatable about the hinges to access the catch pan volume. At least one floor module may further include a support arm having a first end coupled with the first grid top surface and a second end coupled with the catch pan structure, which may facilitate lifting and lowering the first grid top surface with respect to the catch pan structure to access the catch pan volume.

At least one floor module may further include a mechanical connector temporarily coupling the floor module to at least one other floor module. At least one first floor module may span one-half of a width of the unfinished vehicle body, and at least one second floor module may span one half of the width of the vehicle body, and the first floor module may be positioned adjacent to the second floor module so as to span the entire width of the unfinished vehicle body. At least one floor module may span an entire width of the vehicle body.

The utility may be vacuum, air, electricity, or water. There may be a first utility manifold carrying air, and a second utility manifold carrying vacuum. At least one floor module may further include a device fixture connected to the second utility manifold and receiving an end of a device connected to the first utility manifold so as to remove via the vacuum debris resulting from operation of the device.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein:

FIG. 1 is a fragmentary isometric view of an embodiment of a modular floor system with an integral utility shown temporarily installed in an unfinished aircraft fuselage to facilitate construction;

FIG. 2 is an exploded fragmentary plan view of a plurality of floor modules of the modular floor system of FIG. 1;

FIG. 3 is an exploded fragmentary side elevation view of a first example implementation of a utility connection component of the modular floor system of FIG. 1;

FIG. 4 is an exploded fragmentary side elevation view of a second example implementation of a utility connection component of the modular floor system of FIG. 1;

FIG. 5 is a fragmentary plan view of adjacent floor modules of the modular floor system of FIG. 1 temporarily coupled together for use.

DETAILED DESCRIPTION

Figure 6:
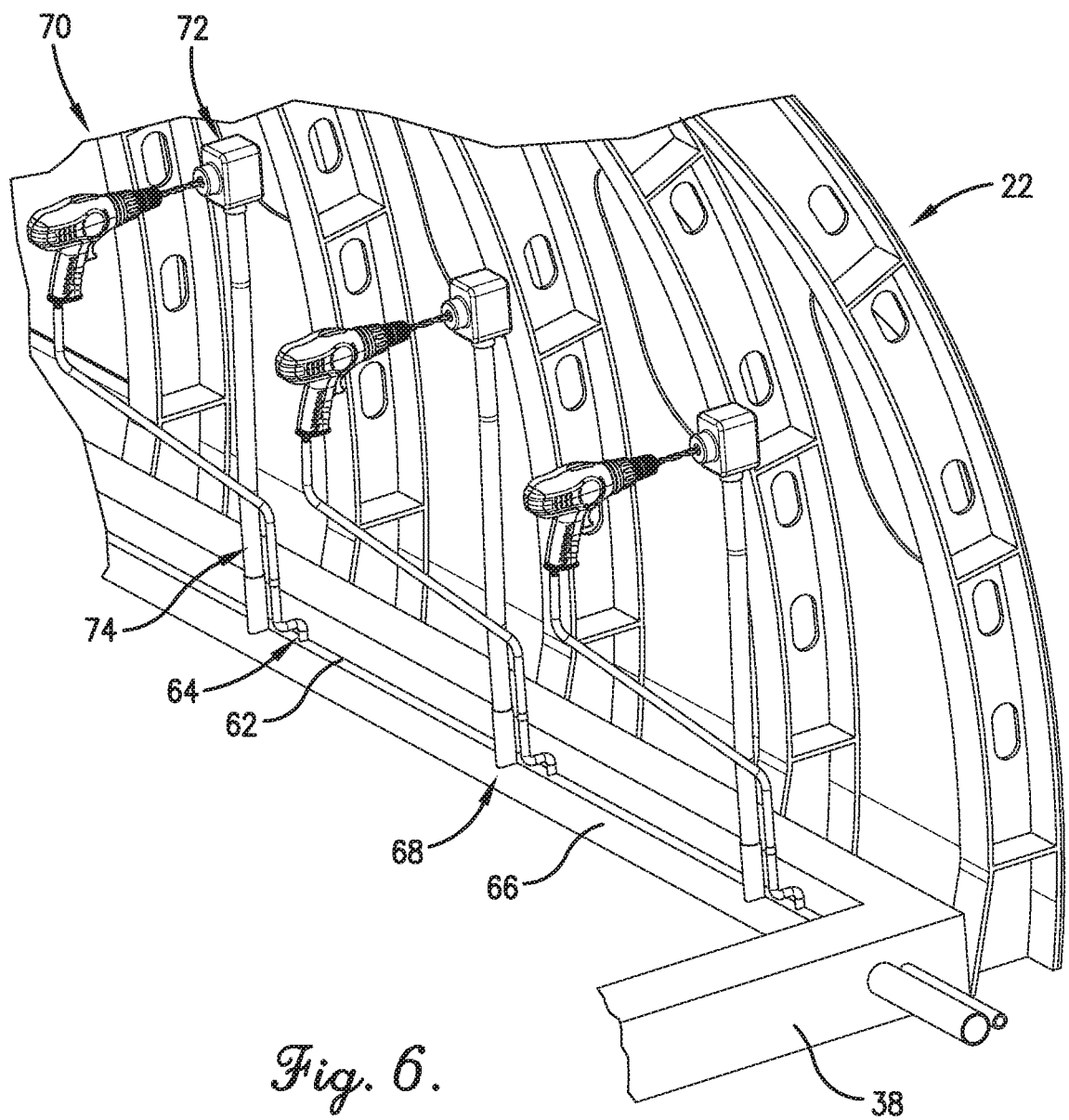
FIG. 6 is a fragmentary isometric view of an example implementation of a utility aspect of the system of FIG. 1, showing multiple utility manifolds and devices and fixtures connected to them.

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Embodiments provide a modular floor system with an integral utility for temporary installation in an unfinished aircraft fuselage or other large vehicle body to facilitate construction. Referring to FIGS. 1-3, an embodiment of the modular floor system 20 is shown temporarily installed in an unfinished aircraft fuselage or other large vehicle body 22 to facilitate work on the vehicle body 22. The unfinished vehicle body 22 may have a length of approximately at least five meters, between five and ten meters, or more than ten meters, and a width of approximately at least three meters, between three and five meters, or more than five meters.

Embodiments may advantageously provide a more stable and secure surface on which workers may stand and work in the unfinished vehicle body; may provide utility connections within the vehicle body and relatively near (i.e., within nor more than ten feet, or no more than five feet) to the point of work, which reduces damage and risk of tripping due to hoses or cords; and catch and retain falling debris and dropped items which facilitates their subsequent removal from the vehicle body.

Broadly, the system 20 may include one or more floor modules 24, and each floor module 24 may include a catch pan structure 26; a grid top surface 28; and one or more utility manifolds 30. Each floor module 24 may be configured for temporary installation in the vehicle body 22 to provide a stable surface on which workers may stand and at least one utility from which they may draw as they perform tasks related to constructing the vehicle body 22. In one implementation, each floor module 24 may be approximately the same shape and size, while in another implementation, seen in FIG. 2, at least some of the floor modules 24 may have different shapes and sizes to conform to different installation locations within the vehicle body 22.

The catch pan structure 26 may be configured to provide structure to physically support the grid top surface 28 and to catch and retain debris and other items to facilitate their subsequent removal. The catch pan structure 26 may include a catch pan volume 34 defined by a bottom 36 and a plurality of side walls 38. The number of side walls 38 may vary depending on the shape of the particular floor module 24, wherein some side walls 38 may be straight and others may be curved, as seen in FIG. 2. The catch pan structure 26 may be constructed of substantially any suitable material, such as aluminum or composite, and the side walls may take substantially any suitable form, such as solid, channel, I-beam, or truss.

In one implementation, at least some of the catch pan structures 26 may further include intermediate walls 40 crossing and dividing the catch pan volume 34 as desired or needed to further support the grid top surface 28. For example, one or more intermediate walls 40 may be incorporated when the nature of the work or the design of the vehicle body 22 at that location within the vehicle body 22 requires such additional support.

The grid top surface 28 may be configured to be positioned on the side walls 38 of the catch pan structure 26 over the catch pan volume 34, and provide the actual surface on which the workers may stand. The grid top surface 28 may include a generally planar surface 42 presenting a plurality of openings 44 through which debris or other items may fall into the catch pan volume 34. The grid top surface 28 may be constructed of substantially any suitable material, such as aluminum or composite; may be coated with substantially any suitable coating, such as a non-slip coating; and the openings may take substantially any suitable shape, such as oval or otherwise round or rectangular or otherwise geometric.

In one implementation, each floor module 24 may include a single grid top surface 28, while in another implementation, at least some floor modules 24 may include two or more independently operable grid top surfaces 28. In one implementation, the grid top surface 28 may be unattached to the catch pan structure 26, while in another implementation, the grid top surface 28 may be hingedly or otherwise attached to the catch pan structure 26. Relatedly, one or more telescoping or otherwise extendable support arms 46 may be provided coupling the grid top surface 28 with the catch pan structure 26 to facilitate lifting and lowering the former with respect to the latter in order to access any debris or items located in the catch pan volume 34. One or more mechanical connectors 50 may be employed to temporarily couple adjacent floor modules 24 together. In various implementations, the mechanical connectors 50 may be use substantially any suitable technology such as bolts, latches, or friction fittings, or, as seen in FIG. 5, clips that fit over and secure together the side walls 38 of adjacent floor modules.

Referring also to FIGS. 3 and 4, the one or more utility manifolds 30 may each be configured to deliver a utility to and through the floor module 24. The utility may any utility which is useful to the workers, such as one or more of vacuum, air, electricity, or water. Each utility manifold 30 may include a utility input connection 52, which may receive the utility and which may be on a first side of the flooring module 24, and a utility output connection 54, which may pass the utility and which may be on the opposite side of the flooring module 24. The utility input connection 52 may engage a utility conduit or source 56 or the output connection 54 of an adjacent flooring module. The utility output connection 54 may be closed (by, e.g., a plug) or may engage with the input connection 52 of an adjacent flooring module. Each utility manifold 30 may also include one or more connection points 58 to which drills, hammers, fastener guns, vacuums, or other such devices may be attached or workers may otherwise draw from the utility.

Referring also to FIG. 6, in one example implementation, there may be two utility manifolds, a first utility manifold 62 carrying air or electricity and presenting first connection points 64, and a second utility manifold 66 carrying vacuum and presenting second connection points 68. A drill or other device 70 may be selectively connected to one of the first connection points 64 and draw from the air or electricity in the first utility manifold 62 to perform tasks involving drilling. Because the first connection point 64 is relatively close (e.g., no more than ten feet, or no more than five feet) to the location where the task is performed, the drill or other device 70 need only have a relatively short length of hose or cord, which reduces or eliminates both the damage and tripping risks of the prior art. A drill or other device fixture 72 may be configured to receive at least an end of the drill or other device 70 and to be selectively connected to one of the second connection points 68 and draw from the vacuum to vacuum away any chips, filings, or other debris resulting from operation of the drill or other device 70. Because the second connection point 68 is also relatively close to the location where the task is performed, the fixture 72 need only have a relatively short length of hose or other conduit 74, which reduces or eliminates both the damage and tripping risks of the prior art.

Referring again to FIGS. 1 and 2, in one implementation, at least some of the floor modules 24 may abutt the longitudinal axis L of the vehicle body 22 and span approximately one-half of the width of the vehicle body 22, so that two floor modules 24 may be installed back-to-back and connected together to span the entire width of the vehicle body 22, with each such floor module 24 being oriented so that its grid top surface 28 is openable toward the center of the vehicle body 22. In another implementation, at least some of the floor modules 24 may be centered upon the longitudinal axis L of the vehicle body 22 and span approximately the entire width of the vehicle body 22.

In operation, an embodiment of the modular floor system 20 may be employed substantially as follows in an example application. A plurality of the floor modules 24 may be moved into and temporarily installed within the aircraft fuselage 22. After the first floor module 24 is installed, each subsequent floor module 24, particularly its utility manifold 30, may connect to the prior one. When the last floor module 24 is installed, the utility source 56 is connected to the utility manifold 30. Workers may then walk over and stand on the grid top surfaces 28 of the floor modules 24 in order to perform various tasks. As desired or needed, workers may connect devices 70 to the connection points 58 on the utility manifold 30 to draw from the utility. Following completion of the tasks, the grid top surfaces 28 may be lifted or otherwise moved, and a vacuum may be used to remove any debris or items caught and retained in the catch pan structure 26. If vacuum is a provided utility, this may be accomplished by connecting a vacuum hose to the utility manifold 30. Once all of the tasks are completed, the floor modules 24 may be uninstalled in reverse order of their installation.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A modular floor system for temporary installation in an unfinished vehicle body to facilitate construction of a vehicle, wherein the modular floor system is removed prior to operation of the vehicle, modular floor system comprising a plurality of floor modules, with each floor module of the plurality of floor modules comprising:
   a catch pan structure comprising a bottom and a plurality of side walls defining a catch pan volume to catch a construction debris generated by construction of the vehicle;
   a first grid top surface comprising a generally planar surface presenting a plurality of openings and being physically supported on the plurality of side walls of the catch pan structure over the catch pan volume to support a worker constructing the vehicle; and
   at least one utility manifold carrying a utility across the catch pan structure and comprising:
      a utility input connection associated with a first side wall of the plurality of side walls and receiving the utility,
      a utility output connection associated with a second side wall of the plurality of side walls, and
      a utility connection point to which a construction tool is connected to draw from the utility,
   the catch pan structure, the first grid top surface, and the at least one utility manifold being removed from the vehicle prior to operation of the vehicle.

2. The modular floor system of claim 1, wherein the unfinished vehicle body is an unfinished aircraft fuselage with a length of at least five meters and a width of at least three meters.

3. The modular floor system of claim 1, wherein at least two of the floor modules of the plurality of floor modules are identical in size and shape.

4. The modular floor system of claim 1, wherein at least two of the floor modules of the plurality of floor modules are different in size and shape so as to conform to different installation locations within the unfinished vehicle body.

5. The modular floor system of claim 1, the catch pan structure further comprising one or more intermediate walls dividing the catch pan volume.

6. The modular floor system of claim 1, wherein at least one floor module of the plurality of modules further comprises a second grid top surface located adjacent to and being independently operable from the first grid top surface.

7. The modular floor system of claim 1, wherein the first grid top surface is attached by one or more hinges to the catch pan structure, and is rotatable about the one or more hinges to access the catch pan volume to access the construction debris generated by construction of the vehicle.

8. The modular floor system of claim 7, at least one floor module of the plurality of floor modules further comprising a support arm comprising a first end coupled with the grid top surface and a second end coupled with the catch pan structure, and facilitating lifting and lowering the grid top surface with respect to the catch pan structure to access the catch pan volume.

9. The modular floor system of claim 1, at least one floor module of the plurality of floor modules further comprising a mechanical connector temporarily coupling the at least one floor module to at least one other floor module of the plurality of floor modules.

10. The modular floor system of claim 1, wherein at least one first floor module of the plurality of floor modules spans one-half of a width of the unfinished vehicle body, and at least one second floor module spans one half of the width of the vehicle body, and the at least one first floor module is positioned adjacent to the at least one second floor module so as to span an entire width of the unfinished vehicle body.

11. The modular floor system of claim 1, wherein at least one floor module of the plurality of floor modules spans an entire width of the unfinished vehicle body.

12. The modular floor system of claim 1, wherein the utility is selected from the group consisting of: vacuum, air, electricity, and water.

13. The modular floor system of claim 1, the at least one utility manifold comprising:
a first utility manifold carrying air; and
a second utility manifold carrying vacuum.

14. The modular floor system of claim 13, at least one floor module of the plurality of floor modules further comprising a device fixture connected to the second utility manifold carrying vacuum and receiving an end of a device connected to the first utility manifold so as to remove via the vacuum debris resulting from operation of the construction tool.

15. A modular floor system for temporary installation in an unfinished aircraft fuselage with a length of at least five meters and a width of at least three meters to facilitate construction of an aircraft, wherein the modular floor system is removed prior to operation of the aircraft, the modular floor system comprising a plurality of floor modules, with each floor module of the plurality of floor modules comprising:
a catch pan structure comprising a bottom and a plurality of side walls defining a catch pan volume to catch a construction debris generated by construction of the aircraft;
a first grid top surface comprising a generally planar surface presenting a plurality of openings and being physically supported on the plurality of side walls of the catch pan structure over the catch pan volume to support a worker constructing the aircraft;
a first utility manifold carrying air across the catch pan structure and comprising:
a first utility input connection associated with a first side wall of the plurality of side walls and receiving the air,
a first utility output connection associated with a second side wall of the plurality of side walls, and
a first utility connection point to which a construction tool is connected to draw from the air; and
a second utility manifold carrying vacuum across the catch pan structure and comprising:
a second utility input connection associated with a first side wall of the plurality of side walls and receiving the vacuum,
a second utility output connection associated with a second side wall of the plurality of side walls, and
a second utility connection point to which a conduit is connected to draw from the vacuum,
the catch pan structure, the first grid top surface, the first utility manifold, and the second utility manifold being removed from the aircraft prior to operation of the aircraft.

16. The modular floor system of claim 15, wherein at least two of the floor module of the plurality of floor modules are different in size and shape so as to conform to different installation locations within the unfinished vehicle body.

17. The modular floor system of claim 15, wherein the first grid top surface is attached by one or more hinges to the catch pan structure, and is rotatable about the one or more hinges to access the catch pan volume to access the construction debris generated by construction of the aircraft.

18. The modular floor system of claim 17, at least one floor module of the plurality of floor modules further comprising a support arm comprising a first end coupled with the grid top surface and a second end coupled with the catch pan structure, and facilitating lifting and lowering the grid top surface with respect to the catch pan structure to access the catch pan volume.

19. The modular floor system of claim 15, at least one floor module of the plurality of floor modules further comprising a mechanical connector temporarily coupling the at least one floor module to at least one other floor module of the plurality of floor modules.

20. A modular floor system for temporary installation in an unfinished aircraft fuselage with a length of at least five meters and a width of at least three meters to facilitate construction of an aircraft, wherein the modular floor system is removed prior to operation of the aircraft, the modular floor system comprising a plurality of floor modules coupled together by a plurality of mechanical connectors, with each floor module of the plurality of floor modules comprising:
a catch pan structure comprising a bottom and a plurality of side walls defining a catch pan volume to catch a construction debris generated by construction of the aircraft;
a first grid top surface comprising a generally planar surface presenting a plurality of openings and being physically supported on the plurality of side walls of the catch pan structure over the catch pan volume to support a worker constructing the aircraft;
a first utility manifold carrying air across the catch pan structure and comprising:
a first utility input connection associated with a first side wall of the plurality of side walls and receiving the air,
a first utility output connection associated with a second side wall of the plurality of side walls, and
a first utility connection point to which a drill is connected to draw from the air;
a second utility manifold carrying vacuum across the catch pan structure and comprising:
a second utility input connection associated with a first side wall of the plurality of side walls and receiving the vacuum,
a second utility output connection associated with a second side wall of the plurality of side walls, and
a second utility connection point to which a conduit is connected to draw from the vacuum; and
a device fixture connected to the conduit and receiving an end of the drill such that the vacuum removes debris resulting from operation of the drill,
the catch pan structure, the first grid top surface, the first utility manifold, the second utility manifold, and the device fixture being removed from the aircraft prior to operation of the aircraft.

* * * * *